United States Patent [19]

Meise et al.

[11] Patent Number: 4,551,754
[45] Date of Patent: Nov. 5, 1985

[54] COMPATIBLE WIDE-SCREEN COLOR TELEVISION SYSTEM

[75] Inventors: William H. Meise, Wrightstown, Pa.; Robert A. Dischert, Burlington, N.J.

[73] Assignee: RCA Corporation, Princeton, N.J.

[21] Appl. No.: 350,088

[22] Filed: Feb. 18, 1982

[51] Int. Cl.⁴ .................. H04N 5/91; H04N 9/535
[52] U.S. Cl. .................................. 358/180; 358/20
[58] Field of Search ............ 358/21 R, 22, 30, 165, 358/180, 183, 188, 287; 315/364, 379, 384, 386

[56] References Cited

U.S. PATENT DOCUMENTS

| | | | |
|---|---|---|---|
| 3,097,262 | 7/1963 | Ehrenhaft | 358/180 |
| 3,908,083 | 9/1975 | Hiraki | 358/180 |
| 4,028,726 | 6/1977 | Argy | 358/165 |
| 4,134,128 | 1/1979 | Hurst | 358/22 |
| 4,216,492 | 8/1980 | Schmalz | 358/183 |
| 4,282,546 | 8/1981 | Reitmeier | 358/22 |

Primary Examiner—Tommy P. Chin
Attorney, Agent, or Firm—P. J. Rasmussen; P. M. Emanuel; R. G. Coalter

[57] ABSTRACT

A wide-angle television system, such as one having 2:1 or 5:3 aspect ratios, transmits end portions that exceed the limits of a conventional 4:3 aspect ratio picture in regions that are normally hidden from view in a conventional receiver. Thus the system is compatible with such a receiver. These regions can comprise the overscan region, blanking intervals, high frequency portions of a chroma signal, etc. Time compression of the end portions can also be used. At a wide-angle receiver, inverse processing is used to reassemble a wide-angle picture.

20 Claims, 9 Drawing Figures

COMPATIBLE WIDE-SCREEN COLOR TELEVISION SYSTEM

BACKGROUND OF THE INVENTION

The present invention relates to wide-screen television systems, and more particularly, to such systems that are compatible with conventional television receivers.

A conventional television receiver has a 4:3 aspect ratio (the ratio of width to height). Recently, there has been interest in using higher aspect ratios for television systems, such as 2:1 or 5:3, which ratios more nearly approximate or equal the aspect ratio of the human eye than does the conventional 4:3 ratio. The 5:3 aspect ratio has received particular attention since motion picture film uses this ratio, and thus can be transmitted and received without cropping. However wide-screen television systems which simply transmit signals having an increased aspect ratio as compared with conventional systems are incompatible with conventional aspect ratio receivers. This makes widespread adoption of wide-screen systems difficult.

It is therefore desirable to have a wide-screen television system that is compatible with conventional television receivers.

SUMMARY OF THE INVENTION

Method and apparatus for transmitting a video signal representing a picture having a given aspect ratio higher than a selected aspect ratio, comprising processing signals derived from end portions of scan lines representing those portions of said given aspect ratio picture exceeding the view of a selected aspect ratio picture, said processing being in a manner different relative to signals derived from the remaining portions of said scan lines, and transmitting the processed end portions during normally unobservable portions of a video signal when received on a receiver kinescope having said selected aspect ratio.

DETAILED DESCRIPTION

Figure 1:
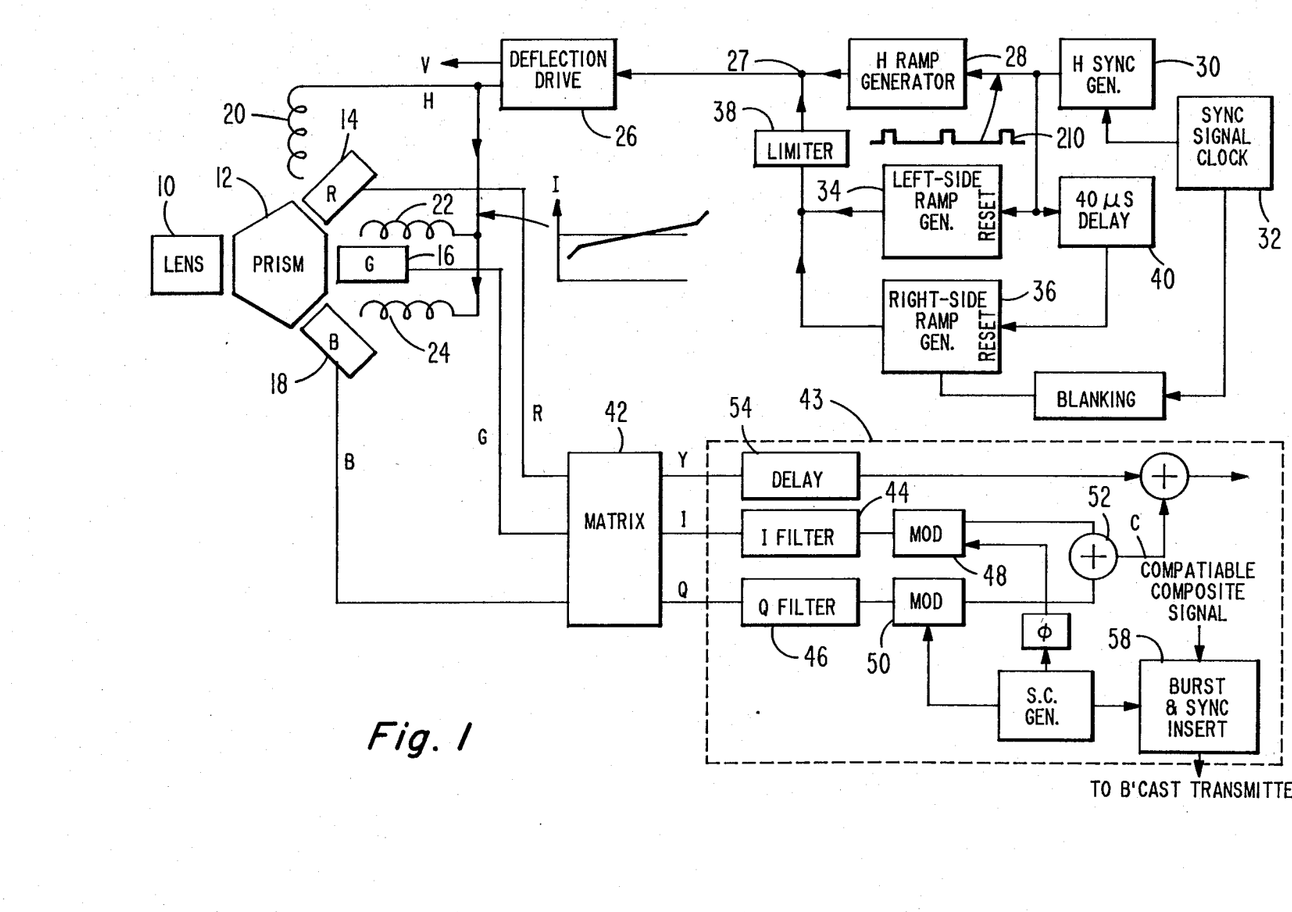
FIG. 1 is a block diagram of a portion of a transmitter in accordance with a first embodiment of the invention.

FIG. 1 illustrates a source of color television signals in which the deflection rate of a camera is varied in such a fashion as to produce a time-compressed signal. In FIG. 1, a lens 10 focuses light from an image (not shown) through a prism 12 onto red (R), green (G), and blue (B) vidicons 14, 16 and 18, respectively. Horizontal deflection windings 20, 22, and 24 are associated with vidicons 14, 16 and 18, respectively, for driving the beams horizontally. Vertical deflection is provided by vertical deflection windings (not shown). A deflection drive circuit illustrated as a block 26 drives the vertical and horizontal deflection windings. The horizontal deflection windings are illustrated as being driven in parallel, but they may also be driven in series. The deflection drive is driven in part from a horizontal ramp generator 28 which generates a recurrent horizontal-rate current or voltage waveform by which deflection drive 26 is driven. Horizontal ramp generator 28 is synchronized by recurrent horizontal synchronizing pulses 210 produced by horizontal sync signal generator 30 which in turn is synchronized from the sync signal clock generator 32.

In order to generate a video signal which is at the normal rate in the center of the raster and which is time compressed at the edges of the raster, the rate of the ramp applied to deflection drive 26 must exceed the rate of the ramp produced by horizontal ramp generator 28 at least part of the time. For this purpose, additional circuitry including a left-side ramp generator 34 is provided. Left-side ramp generator 34 is reset by the horizontal sync pulse from horizontal sync pulse generator 30 at the same time at which horizontal ramp generator 28 is reset. Both ramp generators begin to ramp at the same time. The ramp generated by left-side ramp generator 34 is added at a junction point 27 to the ramp produced by generator 28. A limiter 38 is coupled to left-side ramp generator 34 to limit its signal after a short period of time. When the signal is limited, the ramp produced by generator 34 can no longer affect the ramp generated by ramp generator 28.

Right-side ramp generator 36 is enabled by a pulse generated by a delay circuit 40 which in turn is triggered by horizontal sync generator 30. Thus, the main ramp generator 28 and the left-side ramp generator 34 are triggered simultaneously, at time t0 by horizontal sync pulse 210, to produce a linear main ramp signal 250 (FIG. 2) from ramp generator 28 and a left-side ramp signal 230 from ramp generator 34. These ramps have generally different ramp rates and amplitudes. Left-side ramp 230 ramps upward until a time t2, at which time it reaches a limit value at which limiter 38 takes effect. At a later time, t6 in the example given, 40 μS after H sync, the H sync delayed by delay generator 40 resets right-side ramp generator 36 and sets it to ramping. Generator 36 has a ramp rate and amplitude similar to that of generator 34, and the ramp 240 which is produced reaches a limit at or near the time of the next following H sync pulse. The three ramps 230, 240 and 250 are added either by voltage addition in an adder (not shown) or by generating the ramp signals as currents which can be added by simply summing as illustrated in FIG. 1. The resultant ramp 260 has a slow ramp rate near the center of the raster (between times t2 and t6) and a more rapid ramp rate near the right and left extremes.

Figure 2:
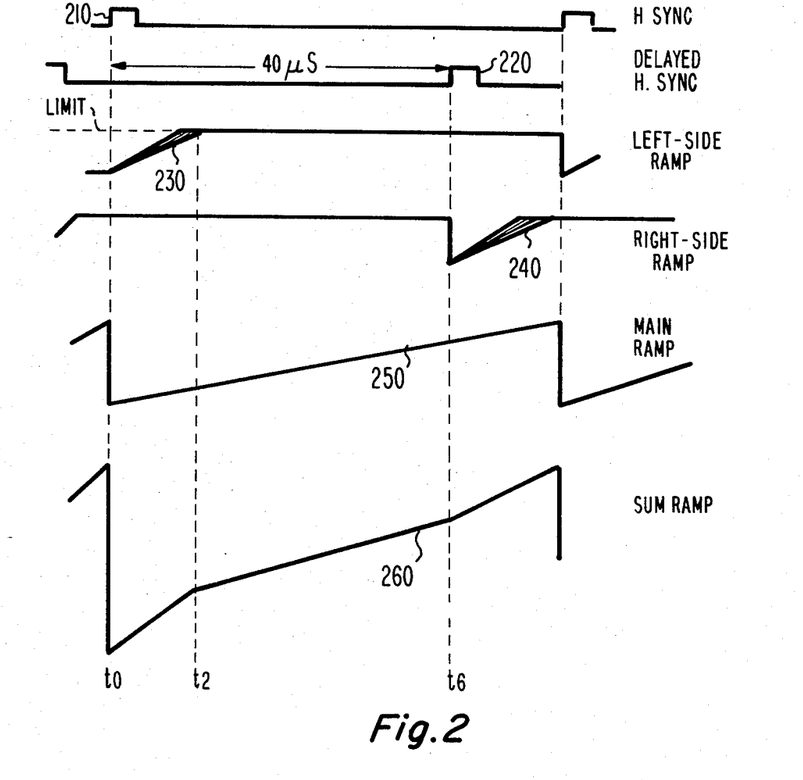
FIG. 2 is a waveform diagram useful in explaining the operation of FIG. 1.

These summed ramps when applied to deflection drive 26 cause the imagers 14, 16 and 18 to scan more quickly near the right and left extremes compared with the central portion of the raster. The resulting video is time-compressed at the edges of the raster. A time compression of about 2:1 is required for 5:3/4:3 aspect ratio conversion, so the rate of the sum ramp 260 between t0 and t2 and between t6 and t0 should be about twice the center-raster rate.

The normal active H scan time for 525-line, 60 Hz signals such as NTSC signals is about 53 µS, corresponding to the "4" portion of a 4:3 aspect ratio. The commensurate duration of the "5" portions of a 5:3 aspect ratio would be 5/4 times 53 µS or about 66 µS. Since about 40 µS at the center of each raster ramains unchanged there is effectively more video remaining in the 5:3 raster outside of the 40 µS central portion than there is video in the 4:3 raster which is outside the 40 µS central portion. The 5:3 raster has 66 µS − 40 µS = 26 µS of effective video, which must be inserted into the difference between 53 µS and 40 µS, which is 13 µS. Thus, 26 µS of effective time duration of 5:3 video must be compressed into 13 µS in the 4:3 raster, which is a time or raster compression of 2:1 at the right and left extremes of the raster.

The time compression of the video by the increased scan rate near the edges of the scanned raster increases the frequency of resulting video over that which it would have with scanning at the same rate as at the center. At least parts of the increased frequency signal will be cut off by the bandwidth limitations of the transmitter through which the signal is ultimately transmitted, and the loss will show up at the receiver display as a loss in resolution of the time-compressed portions. This loss of resolution is not important for the same reason that the loss of resolution of the TV camera and color kinescopes near the scan extremes is not important due to misconvergence and to deflection nonlinearities.

The R, G and B video signals produced by tubes 14, 16 and 18 are applied to a matrix 42 in which Y, I and Q signals are generated. The I and Q signals are applied through bandwidth-limiting I and Q filters 44 and 46 to individual amplitude modulators 48 and 50 for modulation onto mutually quadrature carriers, in known fashion. The modulated I and Q signals are added in an adder 52, and the added C signals are summed with a luminance signal that has been passed through an equalizing delay 54. This produces a compatible composite signal which is applied to a burst and sync inserter illustrated as a block 58, where sync, burst, blanking and the like are inserted. The signal may then be processed, as by recording, but ultimately is broadcast either over the airwaves or by cable to receivers.

Two types of receivers are possible; conventional relatively narrow-angle 4:3 aspect ratio or special 5:3 aspect ratio receivers according to the invention. Naturally, the special receivers may be arranged to display standard 4:3 aspect ratio when compatible composite wide-angle signals are not being broadcast. The standard 4:3 receiver receives the compatible wide-angle signal and simply displays it together with its nonlinearity. Since the nonlinearity is at the right and left extremes of the raster, the principal portion of the compressed video is hidden from view by the overscan. Overscan on commercial receivers is typically 10% on each side, or a total of 20%. The compressed portion of the compatible wide-angle signal is 13 µS out of 53 µS, which is about 20%. Thus, most of the compressed signal is hidden. In another embodiment of the invention, described below, the concealment is improved.

Figure 4:
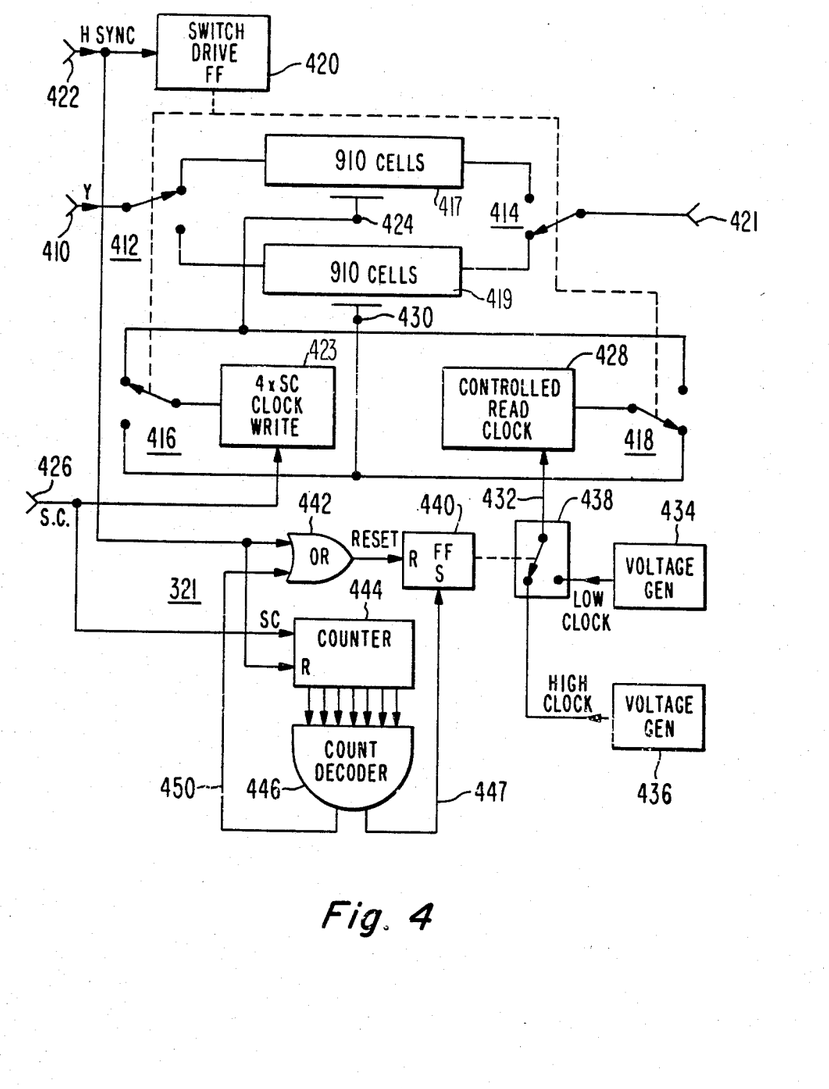
FIG. 4 is a block diagram of an expander circuit used in FIG. 3.

The point at which time-compression begins may appear as a vertical line near the right and left extremes of a receiver displaying standard-format signals. Concealment is aided by changing over between the time-compressed video and uncompressed video in a gradual manner. At the encoder of FIG. 1, this is accomplished by low-pass filtering the additional left and right extreme ramp signals before adding them to the principal ramp signal. The rounded ramp edges produced by filtering in turn increase the time required for the transition between time-compression and non-compression. In the decoder of FIG. 4, the same result is accomplished by low-pass filtering the control input to the voltage-controlled oscillator.

Figure 3:
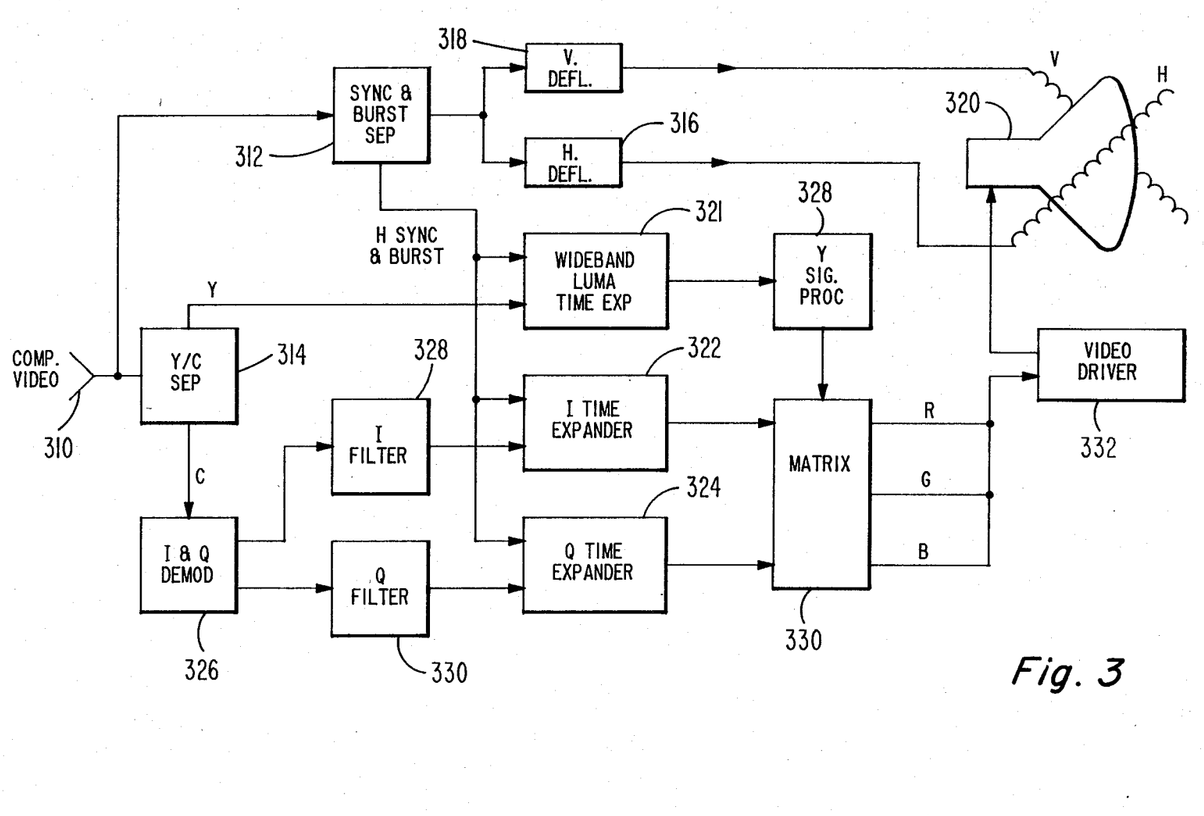
FIG. 3 is a block diagram of a portion of a receiver used for receiving signals transmitted by the transmitter of FIG. 1.

FIG. 3 illustrates a portion of a television monitor especially adapted for displaying a 5:3 aspect ratio picture from a compatible wide-angle video. The compatible composite wide-angle video is applied by way of an input terminal 310 to a sync and burst separator 312 and to a luminance-chrominance (Y/C) separator 314.

Horizontal and vertical sync signals are extracted from the composite video and applied to horizontal and vertical deflection circuits 316 and 318, respectively, for synchronizing the deflection of the electron beams of a kinescope 320 with an amplitude to form a 5:3 raster. Horizontal sync is also applied from separator 312 to Y, I and Q time expanders 321, 322 and 324, respectively, for synchronizing the operation of the expanders with the incoming signal. Separated luminance signal is applied to a time expander 321 from the Y output terminal of luminance-chrominance separator 314. The modulated chrominance signal is applied to I and Q demodulators illustrated as a block 326 which receives for this purpose separated burst signal from separator 312 by a path, (not shown). The demodulated I and Q signals are applied by way of I and Q switching-signal suppressing filters 328 and 330, respectively, to corresponding I and Q expanders 322 and 324. The time expanders, illustrated in more detail in FIG. 4, time-expand the signals at the right and left extremes of the raster in a manner offsetting the time compression operation performed at the encoder of FIG. 2. The partially time-expanded signals from luminance expander 321 are applied to further luminance-signal processing circuits illustrated as a block 328, which may include noise suppression, gamma correction, time delays, and the like ordinarily used for television display. The processed luminance signal is applied to a matrix 330, together with the partially time-expanded I and Q signals from expanders 322 and 324, where the signals are linearly added to produce red, green and blue signals which are applied to video amplifiers illustrated as a block 332. The amplified R, G and B signals are applied to kinescope 320. Due to the operation of time expanders 321, 322 and 324, the video signals have the same time characteristics over the duration of each horizontal line, and undistorted video is displayed on the 5:3 raster.

FIG. 4 illustrates time expander 321 in greater detail. Time expanders 322 and 324 are similar. In FIG. 4, luminance signal is applied to an input terminal 410, which is coupled to the toggle of a single pole, double-throw switch 412. For ease of explanation, switches are illustrated as being mechanical. Switch 412 is driven synchronously with switches 414, 416 and 418 by a switch drive circuit 420. Switch drive 420 includes a flip-flop (FF) which triggers on each horizontal sync pulse received from input terminal 422 of expander 321. Consequently, the switch drive produced by circuit 420 is at half the line rate, i.e., the switches assume one of two positions during every other horizontal line and the other position during alternate horizontal lines. At the time illustrated in FIG. 4, switches 412 and 414 are arranged to load received partially time-compressed signal into a memory or delay line 417 and to unload or read out signal from a second delay line 419 to an output terminal 421 of expander 321. The signal received at terminal 410 must be stored as it is received so as not to lose information. Consequently, a WRITE clock generator 423 is coupled by switch 416 to clock input terminal 424 of delay line 417 for control of the loading rate. Delay lines 417 and 419 in this embodiment are CCD analog delay lines which load a sample of the signal for each clock pulse, and simultaneously unload at the other end. Clock generator 423 receives from a terminal 426 subcarrier signals locked to the burst of the compatible composite color signal and produces clock pulses at a frequency of four times the subcarrier rate ($4 \times SC$) in order to clock the delay lines to which it is coupled at subcarrier phases periodically related to I and Q, in known fashion. Each delay line includes sufficient capacity to store information relating to an entire horizontal line, which as illustrated requires 910 cells when loaded at the $4 \times SC$ rate. Loading is at a constant rate, so that the compatible color signal (in this case, the luminance component) stored at the end of a loading interval in each delay line would, if it could be viewed as a function of position within the delay line, appear relatively time-compressed at each end relative to the center.

At the same time that loading is occurring in delay line 417, delay line 419 is being unloaded to form the partially time-expanded output signal at terminal 421. The partial time-expansion is accomplished by varying the clocking rate of delay line 419 during the unloading interval, in a manner which compensates for the time-compression applied to the signal at the encoder. Controlled switch 418 couples controlled-rate read clock 428 to clock input terminal 430 of delay line 419. The frequency of clock 428 is controlled by the voltage applied thereto on a control line 432. Two read-out clock rates are provided; a first relatively high clock rate for the principal central portion of the signal and a second realtively lower rate for that portion at the left and right extremes. In order to have two different clock rates, two different voltages must be applied to the control input terminal of read clock 428 by way of line 432. These voltages are supplied from first and second voltage generators 434 and 436, which are coupled to line 432 by a multiplex switch 438. The position of switch 438 is controlled by a flip-flop 440 which is reset by horizontal sync applied by way of an OR gate 442. A counter 444 is also reset to zero by each horizontal sync pulse, and counts subcarrier cycles obtained from a crystal-controlled chroma oscillator (not shown). While in the reset state, FF 440 controls switch 438 to select voltage generator 434, corresponding to the low clock rate. At this rate, the information stored in delay line 419 begins to clock therethrough. The first information to come out is the signal which was formerly time-compressed, but which by virtue of clocking at a low rate is time-expanded. During this interval, counter 444 counts subcarrier cycles. A logic circuit 446 coupled to counter 444 responds to the count of 27 subcarrier cycles, corresponding to 7.5 $\mu S$. Thus, logic 446 produces an output pulse on conductor 447 just as the last of the left-end compressed information leaves delay line 419. The pulse sets FF 440, causing it to toggle and drive switch 438 to select voltage generator 436 for control of clock generator 428. The voltage of generator 436 is selected to operate oscillator 428 at a relatively high rate, so that time-expansion does not occur. Logic circuit 446 responds to a second unique count of counter 444, which corresponds to 47.5 $\mu S$, or about 7.5 $\mu S$ before the next following horizontal sync pulse. This second pulse from logic 446 is applied by a conductor 450 to FF 440 by way of a second input terminal of OR 442 to reset FF 440, causing switch 438 to toggle and again select LOW rate generator 434 to return to a time-expansion mode for the information for the right side of the raster.

At the occurrence of the next following horizontal synchronizing pulse, FF 420 is triggered and changes state, thereby operating switches 412-418 to couple delay 419 to input terminal 410 to begin loading, and connecting the output of delay 417 to output terminal 421 in readiness for unloading. Also, the H sync pulse resets counter 444 and FF 440. The next line of partially time-expanded information is then read from delay 417, with the rate of read-out changing under control of the counter.

The term time-expansion or compression relates to the relative duration in the television signal of portions of the signal representing equal angles of view or equal portions of a raster. This may be more clearly understood by noting that the duration of a horizontal line was 63.5 $\mu S$ before the operation so far described in conjunction with FIG. 4, and the duration is still 63.5 $\mu S$ after the operation. It is the relative duration of the various portions within the line which has been changed. In particular, the edge portions have been time-expanded relative to the central portion.

Figure 5:
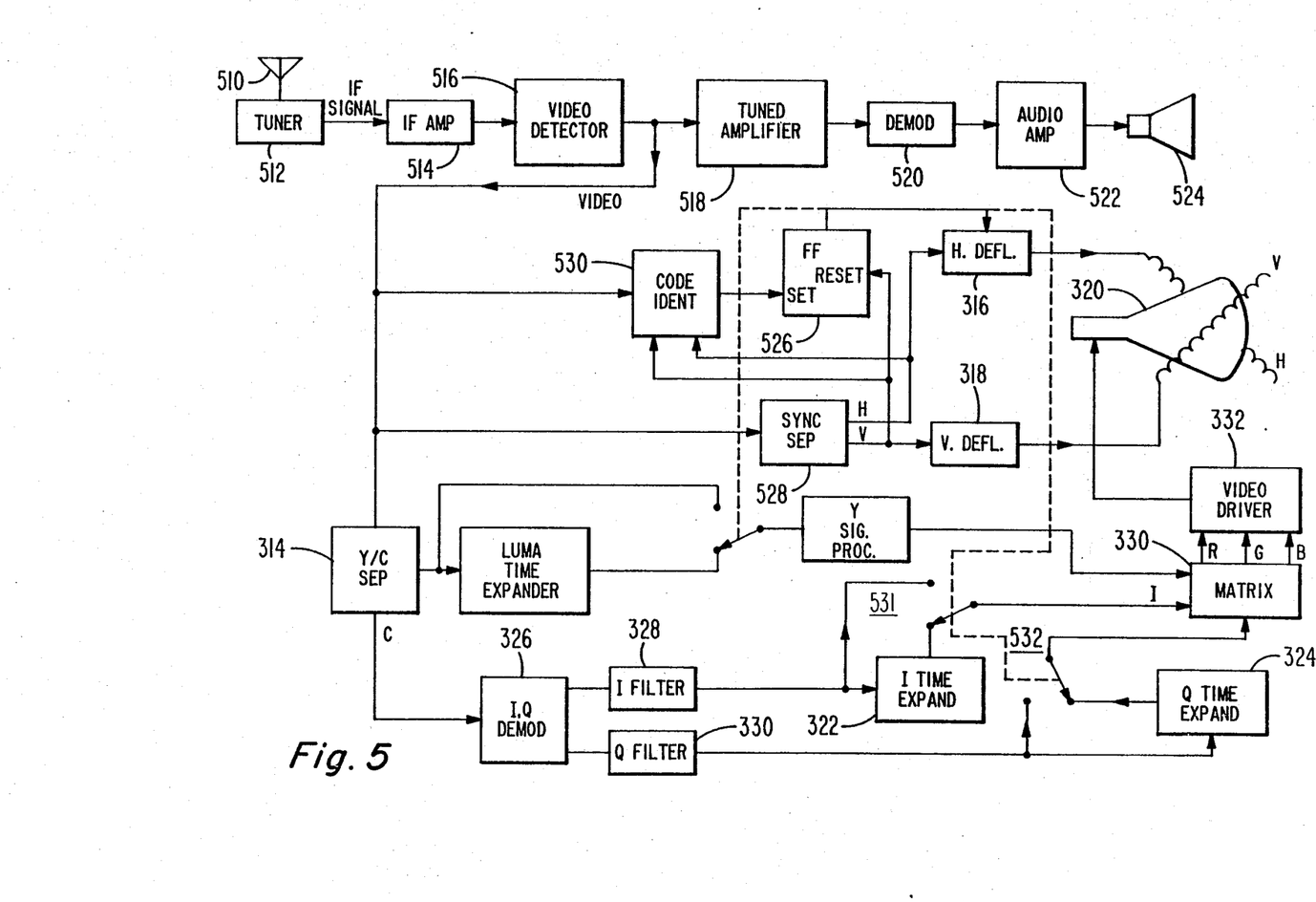
FIG. 5 is a block diagram of a compatible receiver.

The arrangement of FIG. 5 illustrates a television receiver adapted for receiving compatible broadcast signals. This receiver includes an antenna 510 coupled to a tuner 512 which selects the desired channel, amplifiers and down-converts the signal to an intermediate frequency (IF). A IF amplifier 514 further amplifies the IF signal and applies it to a detector 516 to form baseband composite video and intercarrier sound signals, in known manner. The sound signal is coupled through a tuned amplifier 518 to an FM demodulator 520 which produces an audio signal, which in turn is amplified by an amplifier 522 and applied to a loudspeaker 524. The baseband video signal is also applied to an arrangement similar to that of FIG. 4, but differing in that those portions applicable only to compatible composite signals may be bypassed when standard signals are being broadcast. Since the standard signals have a different aspect ratio, the aspect ratio of the displayed raster must also be changed by reducing the raster width when standard signals are to be displaced. The receiver of FIG. 5 incldes a flip-flop (FF) 526 which operates switches coupled to the various portions of the receiver for changing the picture aspect ratio and for disabling the time expansion. FF 526 is reset during each vertical sync interval by a vertical sync pulse from a sync separator 528 to operate the switches for receipt of standard-type signals. A unique coded signal is transmitted within the compatible composite signal during that portion of the vertical blanking interval following the sync signal when compatible wide-angle composite signals are being transmitted. A code detector 530 detects the presence of the coded signal and produces a pulse which is applied to set FF 526. Thus, the receiver adapts itself to either a standard 4:3 aspect ratio signal or to a 5:3 aspect ratio signal.

An output of FF 526 is applied to an input of horizontal deflection circuit 316 in the SET condition corresponding to the reception of compatible composite wideband signals. The SET signal applied to horizontal deflection 316 controls the deflection width. Control of the deflection width is well known and can be accomplished, for example, by controlling the energizing voltage of the horizontal output stage (not shown). Thus, during the transmission of compatible wide-angle signals, the SET output signal of FF 526 increases the horizontal deflection width to form a wide-angle or 5:3 raster.

In the arrangement of FIG. 5, a switch 531 is coupled to both the input and the output of I time expander 322 for selecting either the input or the output signal as an input signal to matrix 330. Similarly, a switch 532 couples the another input of matrix 330 to either the input or the output of Q time expander 324. Switches 531 and 532 are controlled by the condition of FF 526. In the reset state, which corresponds to the transmission of standard signals, switches 531 and 532 select for the respective inputs of matrix 330 signals unmodified by expanders 322 and 324. In the SET condition of FF 526, switches 531 and 532 switch to the alternate position as shown, so that the I and Q signals applied to matrix 330 pass through expanders 322 and 324, respectively.

In the embodiments of FIGS. 1-5, the transition between standard-rate information and the compressed information occurs instantly. This instantaneous transition may be noticeable as a line near the right and left extremes of the raster when the signal is viewed on a standard 4:3 aspect ratio receiver. In order to reduce the visibility of the transition, the change in scanning rates can be made gradual. In particular, a ramp-type time-compression can be used, in which there is zero time-compression at the center of the picture and out to near the edge of the overscan region, and in which only relatively small time compression occurs at said edge but which increases with distance away from the center of the screen. With a function of this sort, the loss in resolution resulting from limited bandwidth of the transmission system occurs principally at the far extremes of the raster, well into the overscan region on the standard set. Naturally, the wide-angle set has an inverse time-expansion function for producing the wide picture.

Thus, the arrangement of FIG. 1 produces a wide-angle signal and time-compresses the right and left extremes of the signal to accomodate wide-angle information within a standard or narrow-angle signal format. The arrangement of FIGS. 3, 4 and 5 shows receivers adapted to receive and process a signal encoded by the arrangement of FIG. 1 and, in the case of the receiver of FIG. 5, to automatically switch between a wide-angle receiving and displaying configuration and a standard-angle receiving and displaying configuration, depending upon a coded signal transmitted therewith.

Figure 6:
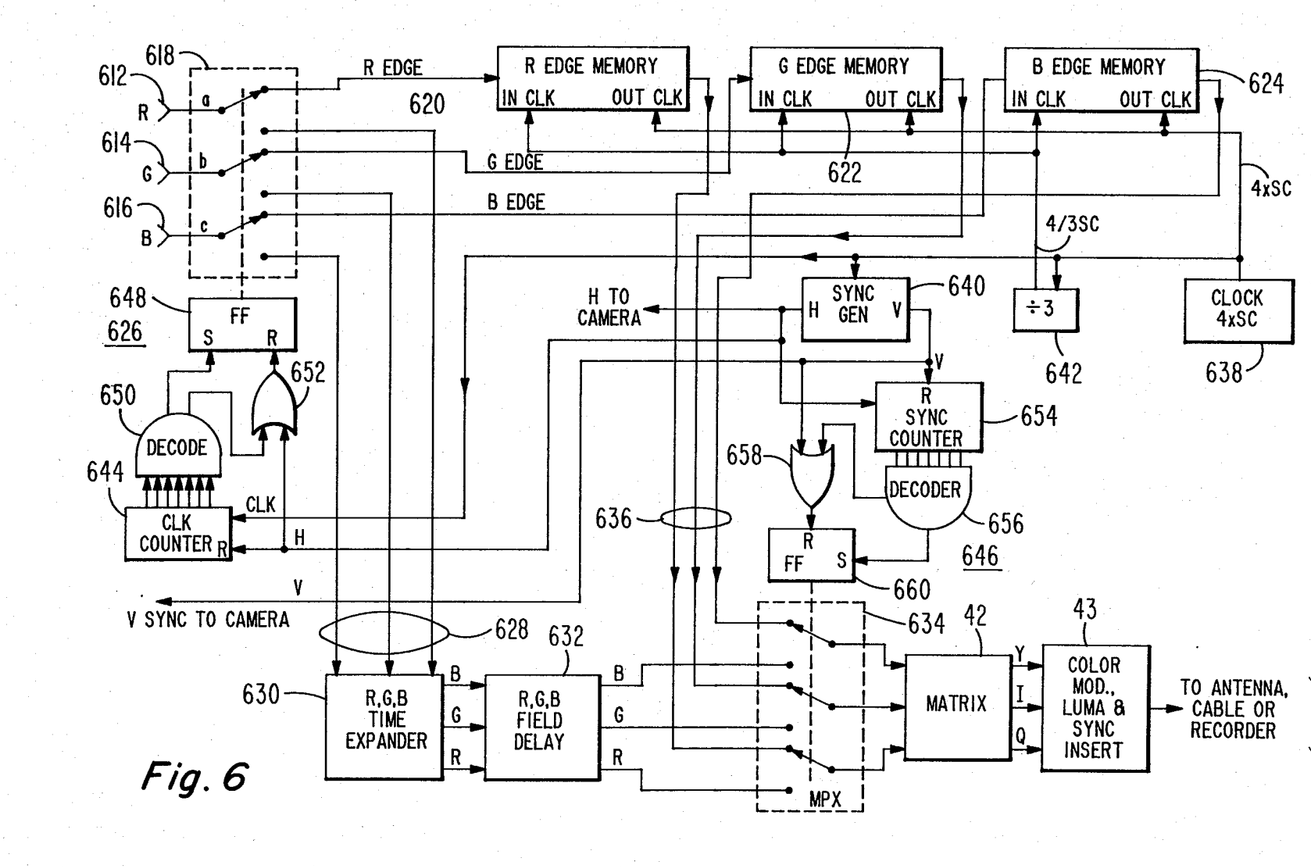
FIG. 6 is a block diagram of a portion of a transmitter in accordance with a second embodiment of the invention.

The arrangement of FIG. 6 generates a compatible wide-angle signal in a different manner. The arrangement of FIG. 6 separates the left and right-side information in excess of the standard 4:3 format and conceals it for transmission by placing it within the vertical blanking interval (VBI). The VBI normally has a total duration of 19 H, of which 3 H precedes the V sync pulse interval, and 3 H of which occurs during the V sync pulse, leaving about 13 H after the V sync interval. There are about 240 active lines per field, and information can be inserted in about 10 of the lines within the vertical blanking interval following the vertical sync interval. Consequently, the excess information from about 24 active horizontal lines must be fitted into each H interval of the vertical blanking interval. There are approximately 13 extra microseconds of information in each horizontal line of 5:3 format over that of the 4:3 format, as mentioned. Thus, the excess information from 24 lines totals about 280 $\mu$S, to be fitted into one H line of the vertical blanking interval. This is a compression rate of about 5:1. The compression ratio required can be somewhat reduced by noting that within the vertical blanking interval the active line duration can exceed 53 $\mu$S, and in fact can be about 58 $\mu$S.

This compression ratio could be used but might be so high that the loss of resolution in the edge information due to frequency bandwidth limitations of the transmission channel would be excessive.

The compression ratio can be reduced to near 2:1 by additionally using about 10 lines of the active video portion to carry the information. For example, the last 10 H lines of the vertical blanking interval, the first 5 active H lines at the top of the raster, and the last 5 active H lines at the bottom of the raster could be used for carrying left and right extreme information. This portion of the raster is normally in the overscan region of a standard television receiver, and is therefore concealed from view. In a special receiver adapted for receiving the compatible wide-angle signals, it likewise would be concealed by the overscan. If 20 lines are available distributed 15-5 as described, the number of active lines being displayed is reduced from 240 to 230. The excess information from 11.5 lines must be fitted into each horizontal line interval of the edge-carrying interval, for a compression ratio of $$(11.5 \times 13)/58 \approx 2.5$$

In FIG. 6, individual R, G and B signals are applied to input terminals 612, 614 and 616 from a source (not shown) which produces wide-angle signals in a standard 63 $\mu$S H time base. These signals are coupled to an RGB multiplex switch 618 which switches the signals between a throughput path 628 and an edge-memory path. Switch 618 is illustrated operationally as including three mechanical switches. Switch 618a, in the position shown, couples R input terminal 612 to an input terminal of an edge memory 620. Similarly, switches 618b couples G terminal 614 to an edge memory 622, and switch 618c couples B terminal 616 to an edge memory 624. The switches 618 assume the illustrated positions during the first and last $61\frac{1}{2}\mu$S intervals of each horizontal line, under the control of a switch drive 626. During the central 40 $\mu$S of the active portion of each line, multiplex switch 618 couples R, G and B by throughput conductors 628 to a time expander 630.

During the first and last 6.5 $\mu$S "edge" intervals of each line, edge memories 620–624 are clocked at a frequency of 4/3XSC to write in or record the edge information. If memories 620–624 are digital memories, the associated ADC (not shown) must be clocked at a like rate. This writing stores low-resolution edge information in RGB form for each horizontal line. The addressing of the memories is accomplished if necessary by an address generator (not shown). The memory organization can be a simple first-in, first-out (FIFO) type, for which address generators are well known.

Since the transmitted signal must be compatible, the central portion of each horizontal line, corresponding to a 4:3 aspect ratio picture, must occupy a standard duration of about 53 $\mu$S. However, the interval during which switch 618 assumes the alternate (throughput) position is only about 40 µS. Time expander 630 is arranged to expand the time of the throughput signal from 40 µS to about 53 µS. Time expanders and compressors are also well known, and need no further explanation. The time-expanded signal is applied to a field delay 632.

The purpose of field delay 632 can be explained by noting that the edge information for a particular field is composed of edge information derived from each horizontal line of the active portion of the field. Consequently, edge memories 620-624 are not filled with a field of edge information until the end of the last H line of the field in question. The edge information begins to be read out from the edge memories, however, during the VBI. If the VBI precedes the field in question, all the information is not yet available. Delay 632 allows for processing time and associates the VBI edge information with the field which immediately follows it. It will be seen that this avoids the need for a field delay in each receiver.

The delayed throughput signal from the output of field delay 632 is applied to input terminals of a multiplex switch 634 generally similar to switch 618. Also applied to inputs of multiplex switch 634 by way of a conductor 636 are the R, G and B output signals from edge memories 620-624. Multiplex switch 634 selects R, G and B input signals for matrix 42 from the output of field delay 632 or from the output of edge memories 620-624. The signals so selected are matrixed to form Y, I and Q signals which are applied to a color modulator, luminance and sync signal inserter illustrated as block 43 and corresponding with block 43 of FIG. 1, to produce the compatible wideband composite signal which can be sent to a transmitter, antenna, to a cable or recorder as may be required for signal transmission.

Timing control for the encoder of FIG. 6 and for the camera or other source of signals coupled thereto originates with a 4×SC clock generator 638 which produces 4×SC signals which are applied to the output clock terminals of edge memories 620-624. The clock signals are also applied to a synchronizing signal generator 640, to a divide-by-three frequency divider 642 and to a clock counter 644. Sync generator 640 produces vertical and horizontal sync pulses which are used within control circuit 626 and within a control circuit 646 which controls the switching of multiplex gate 634. Frequency divider 642 generates the 4/3 SC signals which are applied to the input clock terminals of edge memories 620-624 for clocking signals in at a lower rate than that at which they are clocked out.

Control of multiplex switch 618 by control circuit 626 is accomplished by setting and resetting a FF 648. In the reset condition, the switches are in the position illustrated for loading incoming information into the edge memories. This is the condition at the beginning of each horizontal line. Clock counter 644 is also reset to a zero count at the beginning of each horizontal line and begins to count 4×SC clock pulses. At the end of a particular count corresponding to the end of the edge information, a count decoder 650 produces a pulse which is applied to the set (S) input of FF 648 to throw multiplex switch 618 to the alternate position (not shown) for coupling the signals to throughput line 628. The information during the main central portion of the horizontal line is coupled through the throughput path including expander 630 and field delay 632 until FF 648 is reset. Reset is accomplished by decoding by decoder 650 of a second unique count of clock counter 644, corresponding to the beginning of the right-edge portion of the signal of each horizontal line. The second decoded signal is applied from decoder 650 to the reset (R) input of FF 648 by way of an OR gate 652. Thus, each incoming horizontal line is divided into edge portions which are directed to the edge memories and into a throughput portion which is directed through the throughput path.

Control 646 for controlling multiplex switch 634 includes a sync counter 654 coupled to count horizontal sync pulses from sync generator 640 and for being reset by vertical sync pulses. A decoder 656 is coupled to counter 654 for producing pulses representative of unique sync counts. An OR gate 658 couples vertical sync pulses together with pulses from decoder 656 to the reset input of a FF 660. The state of FF 660 controls the state of multiplex switch 634. The switch position illustrated corresponds with the reset condition of FF 660. In operation, controller 646 is reset by vertical synchronizing signals. In the reset state, edge information from the memories 620-624 can be coupled to matrix 42 during the last 10 lines of the vertical blanking interval and during the first 5 lines of what would normally be the active video. At the end of the 5th line of the normally active video interval, decoder 656 responds to the unique output configuration of counter 654 to produce a pulse which is applied to the S input of FF 660 to set the flip flop and to switch multiplex switch 634 to the alternate position (not shown). In the alternate position, the main central portion of the wide-angle signal, time-expanded to fill each horizontal line, is coupled to matrix 42. This continues for about 230 active lines. Decoder 656 responds to the 231st sync pulse to generate a reset pulse which is applied by way of OR gate 658 to the R input of FF 660 to return it to the reset state and to switch multiplex switch 634 to the position shown. Thus, the last few lines of the vertical interval preceding the next following vertical blanking interval are devoted to the coupling of edge information from edge memories 620-624 to the antenna.

As mentioned, a standard receiver will receive and display the time-expanded central portion of the wide-angle signal. The edge information within the last ten lines of the VBI is suppressed, and the edge information transmitted in the first and last 5 lines of the active portion of each field lies within the overscan region of the kinescope and is concealed from view.

Figure 7:
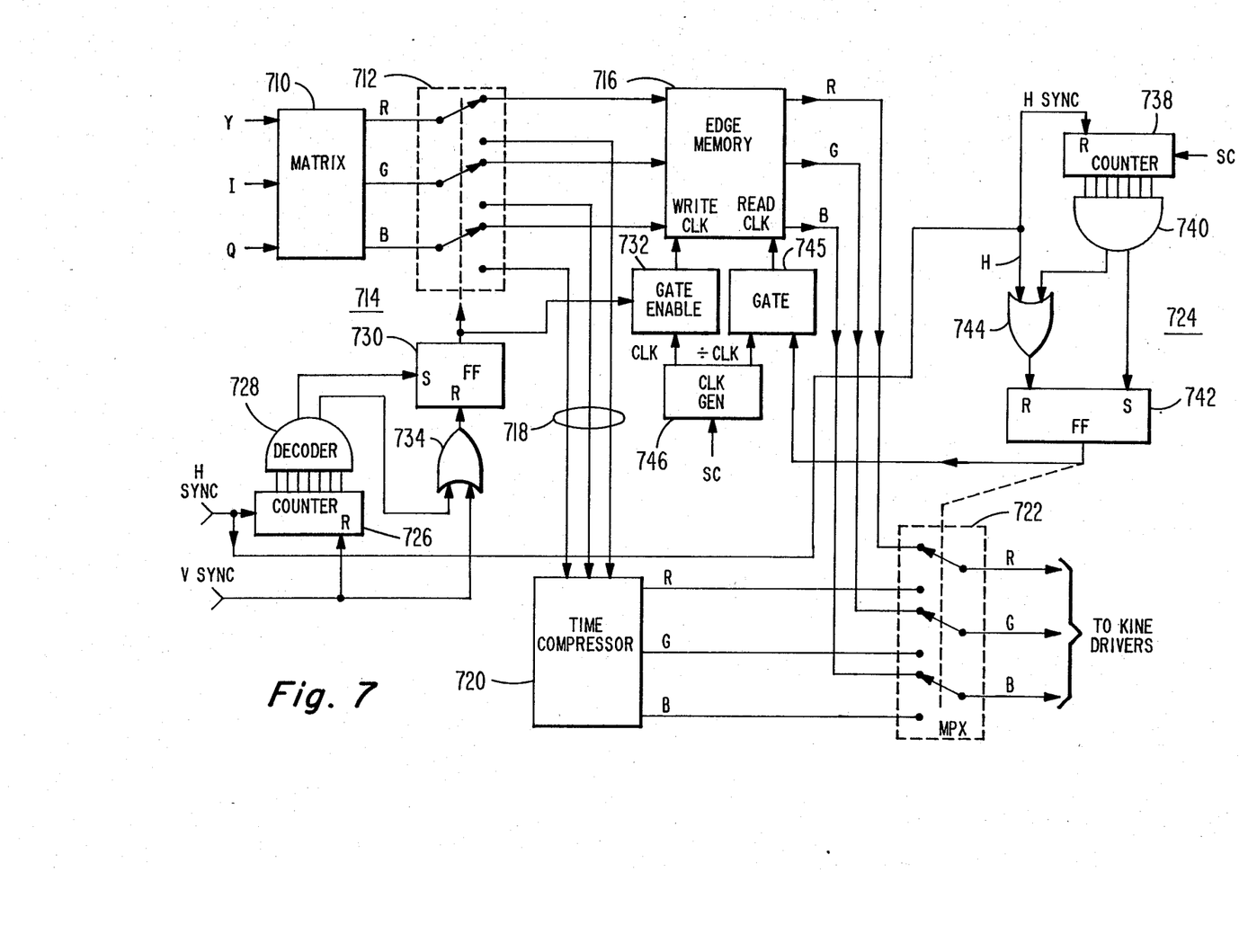
FIG. 7 is a block diagram of a portion of a receiver for use with the embodiment of FIG. 6.

FIG. 7 illustrates a portion of a television receiver for receiving compatible component television signals. Those portions of the receiver which are conventional are not shown. Those portions not shown include the tuner, IF amplifier, AGC and AFC control, video detector, audio signal processing, luminance and chrominance signal processing as far as the demodulator for producing I and Q signals, power supplies, kinescope and deflection. As mentioned, the deflection must produce a raster of appropriate width. Also not shown are switching arrangements for sensing the presence of a compatible wideband component signal or standard signals and for switching the mode of operation of the receiver. In FIG. 7, Y, I and Q signals are supplied both during the active and blanking intervals to a matrix 710 which produces R, G and B signals which are applied to a multiplex switch 712. Multiplex switch 712 is controlled by a control circuit 714. In the position illustrated, the switches of multiplex switch 712 apply the R, G and B signals to corresponding inputs of edge memories illustrated together as an edge memory 716. Edge memory 716 stores the edge information on a FIFO basis at an input or WRITE clock rate which is relatively high. In the alternate position of switch 712, the R, G and B signals from matrix 710 are applied to throughput conductors illustrated together as 718 for application to a time compressor 720. The purpose of time compressor 720 is to time-compress the central portion of the wide-angle information which was previously time-expanded to approximately 53 $\mu$S so that the edge information can be added to form complete lines of wide-angle information having an active duration of approximately 53 $\mu$S.

The R, G and B signals from time compressor 720 and from edge memory 716 are applied to a multiplex switch 722 which is switched during each horizontal interval so as to combine the edge information with the central information. Multiplex switch 722 is controlled by a control circuit 724. The combined video in each horizontal line which is representative of wide-angle information is coupled from multiplex switch 722 to further video processing and eventually to kinescope drivers to produce a visual display.

Control 714 by which multiplex switch 712 is controlled includes a counter 726 which is reset by vertical sync pulses from a sync separator associated with the receiver (not shown) and which counts horizontal sync pulses from the sync separator. A decoder 728 responds to a count of 21 horizontal lines after a beginning of a vertical sync interval. The actual count may be other than 21 because of the characteristics of the vertical sync detector, which does not respond until some time after the beginning of the vertical sync interval. The count of 21 lines is intended to set FF 730 at the end of the 5th line following the end of the standard vertical blanking interval, at which time the first portion of the edge information of the field in question arriving at matrix 710 ends and the main or throughput signal begins. When set, FF 730 switches and causes the switches of multiplex switch 712 to assume the alternate state, thereby coupling the information to the throughput path by way of conductors 718 and time compressor 720 to switch 722. Counter 726 continues to count horizontal sync pulses, until a count is reached which is indicative of the end of the throughput signal and the beginning of the second portion of the edge information. Decoder 728 responds at this count and produces a reset pulse on a conductor 732 which is applied by way of an OR gate 734 to the R input of FF 730. When reset, FF 730 restores switches 712 to the positions illustrated to allow further edge information to be stored in memory 716, under the control of an address generator (not shown) if required.

Multiplex switches 712 and 722 cannot be ganged. The edge information arriving at the receiver is grouped together within and near the vertical blanking interval. However, in order to be used, the edge information must be broken up, and each portion must be added to the beginning or the end (i.e. to the right or left side) of the video corresponding to each line.

Control 724 for multiplex switch 722 includes a counter 738 coupled to a source of subcarrier (not shown) for counting subcarrier cycles and also having a reset input terminal coupled to a source of vertical sync for resetting to zero at each vertical sync pulse. A decoder 740 responds to unique counting configurations of counter 738 during each horizontal line to produce pulses indicative of the times of transition between edge information and central or throughput information. These pulses are applied to set FF 742 and to reset it by way of OR gate 744. Horizontal sync pulses are applied to a second input of OR gate 744 to reset FF 742 at the beginning of each line. The output of FF 742 is coupled to multiplex switch 722 to control its condition. The condition shown is that associated with the reset state of FF 742. The output signal of FF 742 is also applied to a gate 745 for controlling the application to a read clock input terminal of edge memory 716 of read clock pulses from a clock pulse generator 746.

In operation, FF 742 is reset at the beginning of each horizontal line by horizontal sync pulses applied to the reset input terminal by way of OR 744. Multiplex switches 722 assume a state which couples signals from edge memories 716 to the following signal processing or kine drivers. Gate 745 is enabled to pass relatively low-frequency read clock pulses which causes reading of left edge information of the line in question. Reading continues while counter 738 counts subcarrier cycles until a count is reached at which it is expected that the left-edge information has ended and throughput information should begin. At this time, decoder 740 produces a set pulse which is applied to the set input of FF 742 to disable gate 745 and to stop reading therefrom, and also to operate multiplex switches 722 to decouple the kine drivers from edge memory 716 and couple them to the output of time compressor 720. This state continues until a second count is reached by counter 738 which is expected to indicate the end of the throughput information, at which time the right-edge information for that line should be read. Since the right-end information immediately follows the left-end information in the organization of memory 716, resetting of FF 742 returns the switches to the position shown to couple the kine drivers to receive the output of memory 716, and also enables gate 745 so that reading can be accomplished. The right-edge information is coupled to the system output until the end of the line, at which time control 724 is reset by a horizontal sync pulse in readiness for the next following line.

Figure 8:
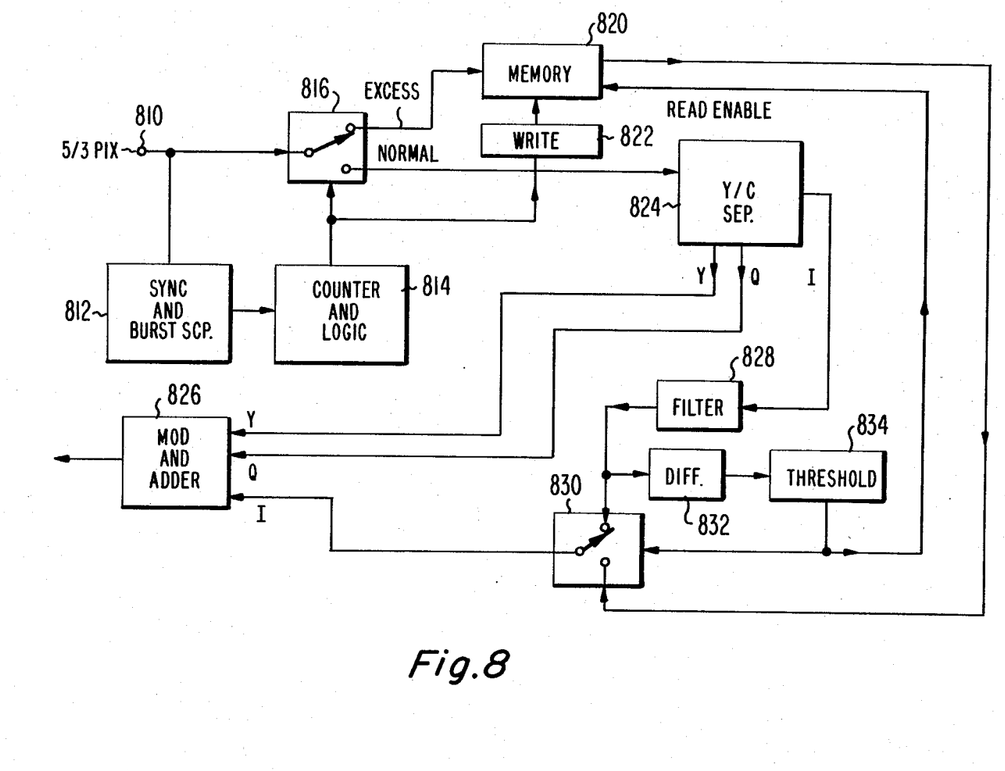
FIG. 8 shows a block diagram of a transmitter in accordance with a third embodiment of the invention.

In a third embodiment of the invention, an encoder of the sort illustrated by a block diagram of FIG. 8 accepts at an input terminal 810 a 5/3 picture including sync and burst information. The sync and burst information is sensed in a sync and burst separator 812 which separator produces a sync pulse for resetting the counter portion of a counter and logic circuit 814 which counter counts burst-related clock pulses to determine time T2 and time T6 during each horizontal line. Counter and logic circuit 814 decodes the count and produces a switch control pulse, which pulse is applied to a multiplex switch 816 which switch diverts the excess information to a memory 820 which memory is enabled for writing by a WRITE enable circuit 822 which circuit in turn is enabled by counter and logic circuit 814 to begin writing into memory as soon as switch 816 is thrown to the upward position to allow signal to flow to the memory. At time T2, switch 816 flips to its downward position and memory 820 stops writing. The noraml 4/3 signal is applied to a luminance/chrominance separating circuit illustrated as 824 which separates Y, I and Q. The Y and Q signals are applied to a modulator and adder circuit 826 where a composite color television signal is reconstituted. The I signal from separator 824 is applied through a filter 828 and a multiplex switch 830 to the I input of modulator and adder 826. At the beginning of each horizontal line, memory 820 contains the excess information from the last half of the preceding line. At each time T2, it also contains information as to the excess information in the first half of the current line. This information is made available at a second terminal of multiplex switch 830. Multiplex switch 830 is coupled to the output of memory 820 and that memory is enabled for reading during high-frequency transitions in the color information by differentiator 832 and threshold circuit 834, at which time information can be pumped through the I channel as is described in more detail in U.S. Patent Application Ser. No. 288,753, filed July 31, 1981, and assigned to the assignee of the present invention. In said prior application, it is described that chroma signal transitions are usually accompanied by luminance signal transitions. Thus preserving chroma signal transitions is not of great importance, and therefore additional information can be transmitted at such times. The added signal does cause chroma signal errors during transitions, but these errors are not particularly visable.

In order to provide sufficient channel bandwidth for conveying the entire excess signal, it may be necessary to take advantage of a second channel associated with the Q signal similar to the extra channel for the I signal.

While the system as depicted in FIG. 8 hides the signal related to the right and left excess information of the 5/3 aspect ratio signal from display in the 4/3 standard system, the bandwidth of the extra channels available varies depending upon the number of high-frequency transitions in the chrominance information. When there are very few high-frequency transitions, the extra-channel capacity decreases and some data may be lost. It is desirable to have the excess information available in a manner which is not so dependent upon the characteristics of the signal being transmitted.

Figure 9:
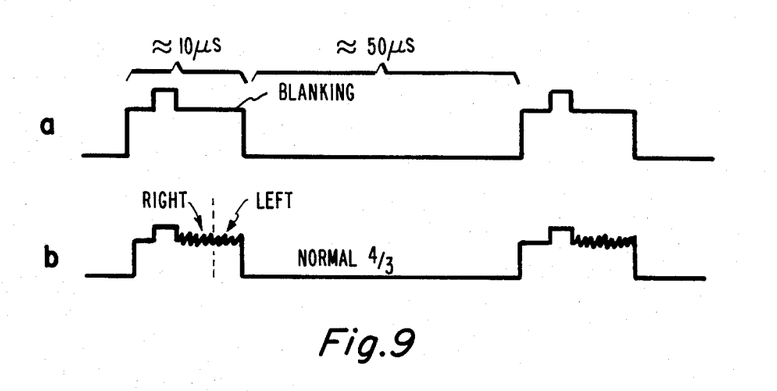
FIG. 9 shows a timing diagram explaining a fourth embodiment of the invention.

FIG. 9 illustrates a horizontal line interval of about 60 microseconds of which about 50 microseconds is available for signal and 10 microseconds for blanking. If half of the blanking interval or 5 microseconds becomes available for the excess information of one line, the amount of available information which can be transmitted increases by 5/50 or ten percent. This is less than the twenty-five percent necessary. However, if the excess information is time-compressed, the time-compressed information can be placed in part of the horizontal blanking interval, time-expanded at the receiving end and used. When the time-compressed signal is passed through a bandwidth-limited FCC-mandated broadcasting system, the high-frequency portions will be attenuated. When the time-compressed signal is time-expanded by the special receiver, the high-frequency portions will be lost. This means that the resolution of the picture and the right and left extremes will be reduced relative to the resolution of that portion of the signal which is not so time-compressed. FIG. 9b illustrates a horizontal line in which the excess signal from the right-hand side of the current line is applied to the last half of the blanking interval after the horizontal sync pulse. The normal aspect ratio signal is sent during the normal 50 microsecond active line time.

In order to keep the system compatible with the standard picture, the time-compresses excess information is also amplitude-compressed or crushed towards black, so that the amplitude variations are small and a standard receiver receives essentially a slightly jittering blanking level. Such a system may, however, interfere with burst signal.

Other embodiments of the invention will be apparent to those skilled in the art. In particular, the time compression of the video signal at the sides of the raster may be accomplished by variable-rate reading or addressing of a memory loaded at a constant rate. Rather than using electrical time expanders as illustrated in the receivers of FIG. 3, scan-rate modulation may be used.

What is claimed is:

1. A compatible wide-angle television system comprising:
generating means for generating recurrent line-scan television signals representative of a wide-aspect ratio scene:
identifying means coupled to said generating means for providing an output signal manifestation identifying first signal portions of each of said line-scan television signals as relating to a relatively narrow-aspect-ratio portion of the scene and second portions as being an excess thereover;
processing means coupled to said generating means and to said identifying means for processing at least a portion of said second portion signals differently relative to said first portion signals, the different processing being selected with respect to the processing of said first portion signals such that a wide-aspect ratio signal is generated which may be displayed on a relatively narrow aspect-ratio raster with a substantial portion of said excess concealed from view.

2. A system according to claim 1 wherein said processing means includes circuit means for time-compressing said second portion signals whereby said excess occupies less time than before time-compression and wherein the time-compression provided by said circuit means is selected such that said second portion signals occupy a time interval corresponding to an overscan region of said narrow aspect-ratio raster.

3. A system according to claim 1 wherein said processing means disassociates said second signal portions from said first signal portions and inserts said second signal portions into a blanking portion of said wide aspect-ratio signal.

4. A system according to claim 3 wherein said blanking portion of said wide aspect-ratio signal includes at least a part of the vertical blanking interval thereof.

5. A system according to claim 1 wherein said wide aspect-ratio signal includes a color signal component and wherein second signal portions are disassociated from said first signal portions by said processing means, and are inserted into transition regions of said color signal component.

6. A system as claimed in claim 1, wherein said processing means alters the temporal relationship of said second signal portions relative to said first signal portions.

7. A system as claimed in claim 1, wherein said processing means inserts said second signal portions into high frequency portions of said first signal portions.

8. A system as claimed in claim 1, wherein said processing means time expands said first signal portions.

9. A system according to any of claims 1 to 8 wherein said second signal portions comprise right and left hand ends.

10. A method for transmitting a video signal representing a picture having a given aspect-ratio different from a selected aspect-ratio, said method comprising processing signals derived from end portions of scan lines representing those portions of said given aspect-ratio picture exceeding the view of a selected aspect-ratio picture, said processing comprising at least one of the steps of (a) time compressing said end portions and (b) separating said end portions from the remaining portions of said scan lines, and transmitting the processed end portions of said scan lines and said remaining portions in a common transmission channel such that said processed portions of the transmitted signal are unobservable when displayed on a receiver kinescope having said selected aspect-ratio.

11. A method as claimed in claim 10, wherein said processed end portions are transmitted in blanking intervals of said transmitted signal.

12. A method as claimed in claim 10, wherein said processed end portions are transmitted in overscan regions of said transmitted signal.

13. A method as claimed in claim 10, wherein said processed end portions are transmitted as high frequency components representative of chrominance signal transitions of said transmitted signal.

14. A method for receiving a video signal representing a picture having a given aspect ratio higher than a selected aspect ratio, said video signal having signals derived from end portions of scan lines representing those portions of said given aspect ratio picture exceeding the view of a selected aspect ratio picture being processed in a given manner which differs from from processing applied to signals derived from the remining portions of said scan lines, the processed end portions being transmitted during normally unobservable portions of a video signal when received on a receiver kinescope having said selected aspect ratio, said normally unobservable portions of said video signal comprising at least one of the blanking, overscan or high frequency portions thereof, said receiving method comprising processing said signals derived from said end portions in a manner complementary to said given manner.

15. A method as claimed in claim 14, wherein said given manner of processing comprises time compressing said end portion signals, and said complementary manner of processing comprises time expanding.

16. A method as claimed in claim 14 wherein said given manner of processing comprises time expansion and said complementary manner of processing comprises time compression.

17. Apparatus for receiving a video input signal representing a picture having a given aspect ratio higher than a selected aspect ratio, said video input signal having a first component derived from end portions of scan lines representing those portions of said given aspect ratio picture exceeding the view of a selected aspect ratio picture and having a second component derived from the remaining portions of said scan lines, a selected one of said components being temporally altered with respect to the other of said components, said first component being transmitted during normally unobservable portions of said video signal when displayed on a receiver kinescope having said selected aspect ratio, said normally unobservable portions including at least one of the blanking, overscan and high frequency portions of said video signal; said receiving apparatus comprising inverse processing means having input means coupled to receive said selected one of said first and second components of said video signal for processing said selected component to provide a video output signal in which the temporal relationship of said first and second components is restored.

18. Apparatus as claimed in claim 17 wherein said selected component of said received video signal is time compressed with respect to the other component, and wherein said inverse processing means comprises circuit means for time expanding said selected component.

19. Apparatus as claimed in claim 17 wherein said selected component of said received video signal is time expanded with respect to the other component and wherein said inverse processing means comprises circuit means for time compressing said other component.

20. Apparatus as claimed in claim 17, further comprising detector means having an input coupled to receive said video input signal for detecting the presence of said video signal having said selected aspect ratio and having an output coupled to said processing means for bypassing said inverse processing means upon said detection.

* * * * *